US007802253B2

(12) United States Patent
Shimomura

(10) Patent No.: US 7,802,253 B2
(45) Date of Patent: Sep. 21, 2010

(54) SYSTEM FOR SESSION MANAGEMENT OF RESOURCES AND TASKS HAVING RECORDS IN THE LOOKUP TABLE FOR THE SESSION

(75) Inventor: Munehiro Shimomura, Kanagawa (JP)

(73) Assignee: Sony Corporation (JP)

( * ) Notice: Subject to any disclaimer, the term of this patent is extended or adjusted under 35 U.S.C. 154(b) by 756 days.

(21) Appl. No.: 10/555,355

(22) PCT Filed: May 7, 2004

(86) PCT No.: PCT/JP2004/006510

§ 371 (c)(1),
(2), (4) Date: Oct. 19, 2006

(87) PCT Pub. No.: WO2004/099984

PCT Pub. Date: Nov. 18, 2004

(65) Prior Publication Data

US 2007/0162910 A1 Jul. 12, 2007

(30) Foreign Application Priority Data

May 7, 2003 (JP) .............................. 2003-129545

(51) Int. Cl.
*G06F 9/46* (2006.01)
(52) U.S. Cl. .................... 718/100; 718/102; 719/313
(58) Field of Classification Search .......... 718/1, 718/100, 102; 719/313
See application file for complete search history.

(56) References Cited

U.S. PATENT DOCUMENTS

| 5,826,080 | A | 10/1998 | Dworzecki et al. |
| 6,112,023 | A | 8/2000 | Dave et al. |
| 6,678,714 | B1 * | 1/2004 | Olapurath et al. ........... 718/104 |
| 2002/0174164 | A1 | 11/2002 | Hayashi |
| 2003/0037091 | A1 | 2/2003 | Nishimura et al. |
| 2003/0084088 | A1 * | 5/2003 | Shaffer ....................... 709/104 |

(Continued)

FOREIGN PATENT DOCUMENTS

EP 0 658 841 A2 6/1995

(Continued)

OTHER PUBLICATIONS

"QSessionManager Class Reference" [Online] 2000, XP002452458 Retrieved from the Internet: URL:http://www.jtz.org.pl/Inne/QT-Tutorial/qsessionmanager.html> [retrieved on Sep. 24, 2007], pp. 1-4.

*Primary Examiner*—Meng-Ai An
*Assistant Examiner*—Caroline Arcos
(74) *Attorney, Agent, or Firm*—Lerner, David, Littenberg, Krumholz & Mentlik, LLP

(57) ABSTRACT

In starting a session, a block ID is assigned to the respective blocks in which session is divided into tasks in every function, and a task lookup table which is a quick reference table for the block ID and a task ID is formed. In performing a message communication, a transmitter task assigns a destination in the block ID and obtains the task ID with reference to the task lookup table. And then, the task ID of the destination is assigned and a transmission and reception of the message is performed by applying a message communication function in OS.

6 Claims, 11 Drawing Sheets

U.S. PATENT DOCUMENTS

2004/0123297 A1* 6/2004 Flautner et al. ............. 718/102

FOREIGN PATENT DOCUMENTS

| | | |
|---|---|---|
| EP | 0 880 094 A2 | 11/1998 |
| JP | 08-055037 A | 2/1996 |
| JP | 08-106441 A | 4/1996 |
| JP | 09-223004 A | 8/1997 |
| JP | 2003-122586 A | 4/2003 |
| WO | WO-02/054238 A2 | 7/2002 |

* cited by examiner

SYSTEM FOR SESSION MANAGEMENT OF RESOURCES AND TASKS HAVING RECORDS IN THE LOOKUP TABLE FOR THE SESSION

TECHNICAL FIELD

The present invention relates to a program processing system, a program processing method, and a computer program of executing an application under a multitasking environment in which a plurality of tasks simultaneously pseudo-operates in parallel, specifically, a program processing system, a program processing method, and a computer program of sharing the same task in a plurality of functions when the application simultaneously operates with a plurality of functions in parallel.

In more detail, the present invention relates to a program processing system, a program processing method, and a computer program of managing a resource and an execution status of the task shared by the functions, specifically, a program processing system, a program processing method, and a computer program of specifying a destination of a message and performing a message communication when a plurality of tasks including the same source code exists.

BACKGROUND ART

Along with an innovative improvement of recent large scale integration (LSI) technology, various information processing equipments and information communication equipments have been developed and marketed, so they have been spread in daily life deeply. In the above type of the equipments, under an execution environment provided by an operating system, a central processing unit (CPU) or other processor executes a predetermined program code to provide various processing services.

Generally, the operating system has a multitasking function in which a plurality of tasks is executed in a time division to make it look as if the tasks were simultaneously executed more than a number of the processors. By using the multitask operating system, an application is formed as the tasks of each function and a plurality of the tasks can simultaneously pseudo-operate in parallel.

However, an operating system disclosed in Japanese Unexamined Patent Publication (Kokai) No. 8-55037 and No. 8-106441, includes a management function in a task unit, however, in the case where a specified function may be realized by a plurality of the tasks, the operation system dose not provide a mechanism in which a series of the tasks concerning the above function is centrally managed. Namely, in the multitasking, only the execution of each task is controlled, however, relevance among the tasks is not considered. Therefore, the respective tasks are demanded to manage the relevance among the tasks, consequently, formability and a maintenancability of a program are lowered.

There is the case where the same task will be shared in a plurality of the functions which simultaneously operate in parallel, however, a mechanism for managing the task to be shared is not provided in the operating system.

Further, under the above multitasking environment, it can be assumed a situation in which a plurality of the tasks having the same source code exists, however, the tasks are not able to be specified dynamically.

In a general inter-object communication, an identification of a destination of a message is performed by applying an object identifying function of the operating system (for example, referred to Patent Document 1 and Patent Document 2). However, in a situation where the same task starts in a plurality of sessions, only by applying a task identifier for identifying the tasks, it may be impossible to specify which session the task is included in.

DISCLOSURE OF THE INVENTION

An object of the present invention is to provide a program processing system, a program processing method, and a computer program able to preferably share the same task in a plurality of functions in the case where an application simultaneously operates with the functions in parallel.

Another object of the present invention is to provide a program processing system, a program processing method, and a computer program able to preferably manage a resource and an execution status of the task shared by a plurality of the functions.

Another object of the present invention is to provide a program processing system, a program processing method, and a computer program able to specify a destination of a message and to preferably perform a message communication in the case where a plurality of tasks including the same source code exists.

The present invention was made in consideration of the above objects, according to a first aspect of the present invention, there is provided a program processing system executing a program including a plurality of tasks under a multitasking environment in which a plurality of the tasks pseudo-operates in parallel and an execution environment provided by a multitask operating system providing an inter-task communication function, the system having: a session defining means for defining a task needed for realizing a function and its execution order in every function provided by the program as a session, and a session management means for managing a resource for executing the session and an execution status, wherein the session management means generates an instance of the respective tasks constituting the session in starting the session, assigns an identification information of the session and an identification information of the instance to the session and the instance of the respective tasks constituting the session, and manages each identification information on a task lookup table of each session.

Note that, the system described above indicates a substance in which a plurality of apparatuses (or function modules for realizing a specific function) is logically aggregated, and it is not a matter whether or not there are the respective apparatuses or function modules in the same housing.

The program processing apparatus according to the present invention further has a massage communication unit of performing a communication among the tasks. The massage communication unit refers to the task lookup table of the session-including the tasks, specifies the tasks based on the instance identification information of a destination task, and performs a transmission and reception of a message. And, the message communication means is built into the respective tasks.

An application program according to the present invention includes a plurality of the tasks, and the tasks are needed for realizing the functions in every function to be provided and an execution order thereof are defined as sessions. And by executing the program under the multitasking environment, the tasks including the same source code simultaneously starts in a plurality of sessions.

The general operating system provides an inter-task communication function, however, it is not able to dynamically specify the tasks including the same source code. Then, in the present invention, when the sessions start, a block ID is assigned in the respective blocks in which the session is divided into the tasks in each functions and a task lookup table functioning as a quick reference table for the block ID and a task ID is formed. The block ID corresponds to an identification information of an instance of the task generated in a session start.

When a certain task transmits a message to other task, the task of a transmitter designates a destination as the block ID and refers to the task lookup table to obtain the task ID. Then, the task ID of the destination is designated, and the message can be transmitted and received by a message communication function in the operating system.

Therefore, according to the present invention, in the case where a plurality of the tasks including the same source code exists, the destination of the message is specified and the message communication can be preferably performed.

According to a second aspect of the present invention, there is provided a computer program described in a computer readable format so as to realize a plurality of functions executed under a multitasking environment in which a plurality of the tasks operates in parallel and an execution environment provided by a multitask operating system providing an inter-task communication function, the program having: a session defining means for defining a task needed for realizing the function and its execution order in every function provided by the program as a session; a session management means for managing a resource for executing the session and an execution status; and a message communication means for communicating among the tasks, wherein the session management means generates an instance of the respective tasks constituting the session in starting the session, assigns an identification information of the session and an identification information of the instance to the session and the instance of the respective tasks constituting the session, and manages the respective identification information on a task lookup table of each session, and the message communication means, based on the instance identification information of a destination task given from the task lookup table, performs the transmission and reception of the message by applying the inter-task communication function in which the operating system is provided.

The computer program according to the second aspect of the present invention, defines a computer program described in a computer readable form so as to realize a predetermined processing on a computer system. In other words, by installing the computer program according to the second aspect of the present invention to a computer system, a cooperative work is performed on the computer system, so a mode of operation and an effect can be obtained similarly to the program processing system according to the first aspect of the present invention.

Other object, feature, and advantage according to the present invention will be apparent in more detail with reference to a later explained embodiment and the accompanying drawings.

BEST MODE FOR CARRYING OUT THE INVENTION

Figure 1:
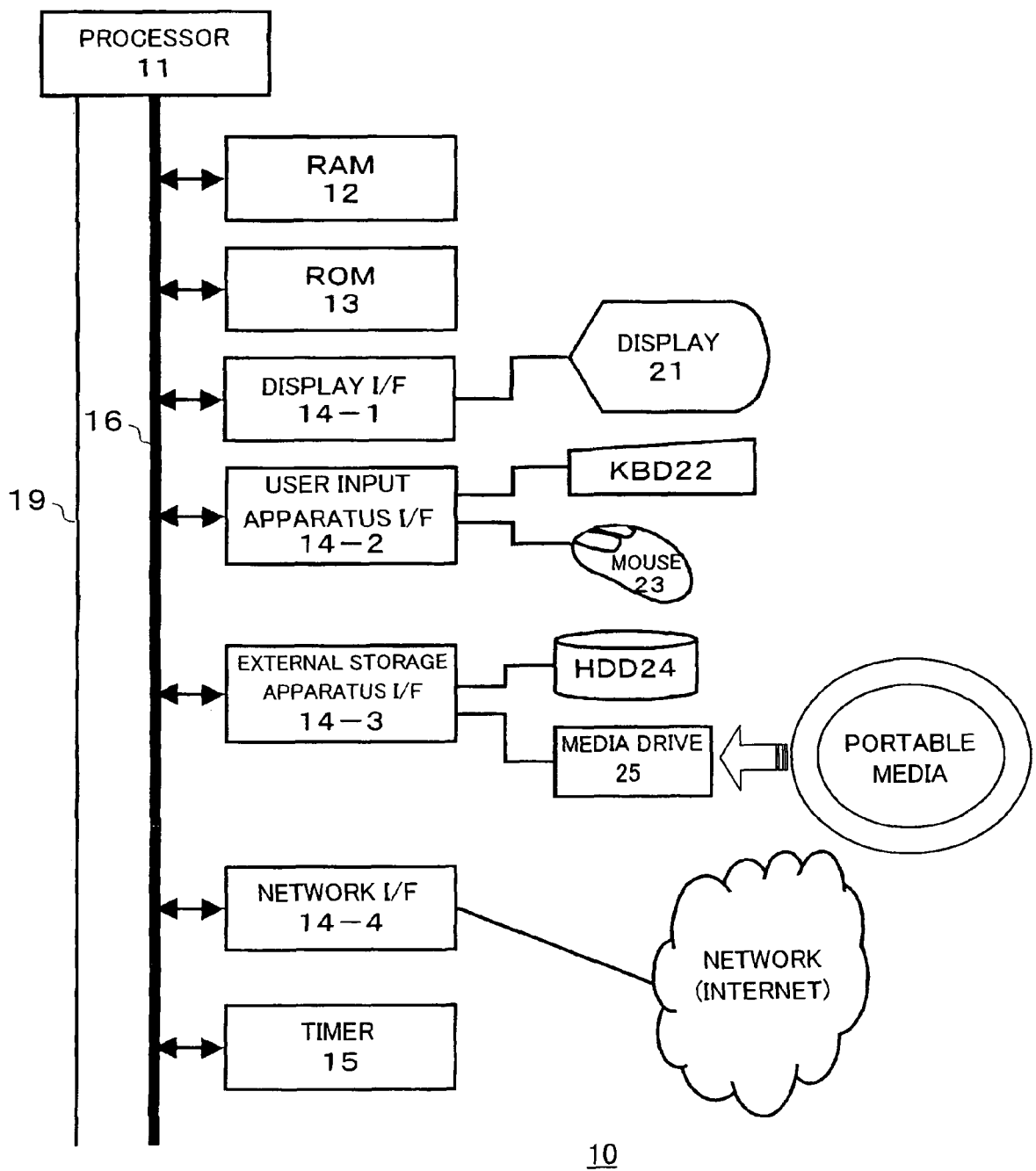
FIG. 1 is a view schematically showing a configuration of a program processing system according to a present embodiment.

A. System Configuration FIG. 1 shows a configuration of a program processing system 10 provided as a present embodiment according to the present invention. As shown in the figure, the program processing system 10 includes a processor 11, a random access memory (RAM) 12, a read only memory (ROM) 13, a plurality of input and output apparatuses 14-1, 14-2, . . ., and a timer 15.

The processor 11 functions as a main controller of the program processing system 10, and executes various program codes such as an application under a control of an operating system (OS). The operating system is formed with a built-in type, for example.

A unit in which the operating system manages and controls a program execution is called as a "task". The program processing system 10 according to the present embodiment is provided with a multitask function which allows a plurality of the tasks to exist in the program, executes the task by a time division, and switches the tasks frequently to thereby execute the respective tasks in parallel. Therefore, there are a number of the tasks larger than that of the processors which are instances actually performing a calculation, so. it looks as if a plurality of tasks is executed in parallel.

The operating system assigns task IDs identifiable to other task in the respective tasks processed by the processor 11, and manages the execution of the tasks. Note that, the operating system does not consider relevance among the tasks to be executed.

On the other hand, the application program to be executed on the program processing system 10 is provided with a plurality of tasks to be executed under the multitasking environment, and can provide a plurality of functions. For example, a built-in application in a DVD recording and reproducing apparatus provides the functions such as a recording and a reproduction in a recording surface of a DVD. In the present description, the task needed for realizing the functions in each provided function service and an execution order thereof are defined as a "session". And a task so-called as a "session manager" is provided, and a resource for executing a called session and an execution status thereof are managed. The resource management as described above includes a generation of the instance of the tasks constituting the session and a management of an input and output operations performed by applying the task. A session operating side can realize a necessary function without paying attention to the status of the respective tasks.

The processor 11 is interconnected to other equipments and the like (described later) by a bus 16. The respective equipments on the system bus 16 are given a peculiar memory address or I/O address, so the processor 11 designates the above address to enable an. access to a predetermined equipment. The system bus 16 is a common signal transmitting path including an address bus, a data bus, and a control bus.

The RAM 12 is a writable memory, and is used to load a program code executed in the processor 11 and temporally store working data of the executing program. As the program code, for example, a basic input-output system (BIOS), a device driver for operating with peripheral equipments by hardware, an operating system, and an application are mentioned.

The ROM 13 is a nonvolatile memory for permanently storing a predetermined code or data, for example, stores BIOS and a power on self test (POST) in starting.

The input and output apparatus 14 includes a display interface 14-1 for connecting a display 21, a user input apparatus interface 14-2 for connecting a user input apparatus such as a keyboard 22 and a mouse 23, an external storage apparatus interface 14-3 for connecting an external storage apparatus such as a hard disk drive (HDD) 24 and a media drive 25, and a network interface card (NIC) 14-4 to be connected to an external network. Note that, types and configurations of the input and output apparatus 14 to be mounted depend on the instance of the program processing system 10.

The display interface 14-1 is an exclusive interface controller for actually processing a description command issued by the processor 11. Described data processed in the display interface 14-1, for example, is written in a frame buffer (not shown) once and is output to a screen by the display 21.

The HDD 24 is an external storage apparatus (well-known) in which a magnetic disk functioning as a storage carrier is fixedly mounted, and is superior to other external storage apparatuses in terms of, for example, a storage capacity and a data transmitting rate. Generally, the HDD 24 stores, for example, a program code of the operating system to be executed by the processor 11, an application program, and a device driver in nonvolatile. To put a software program being executable status on the HDD 24 is called as an "install" of the program in a system. For example, the operating system for realizing the present invention and the application program designed so that a plurality of tasks exists, can be installed on the HDD 24.

The media drive 25 is an apparatus for loading a portable medium such as a compact disc (CD), a magneto-optical disc (MO), a digital versatile disc (DVD), and for accessing a data storage surface thereof.

The portable media are used in order to make a backup of, for example, a software program and a data file as computer writable format data or in order to transfer them among systems (namely, including a sale, a distribution, and a division). For example, by using the above portable media, the operating system for realizing the present invention and the application program designed so that a plurality of tasks exists, can be physically distributed and divided among the equipments.

The network interface 14-1 can connect the system 10 to a local network such as a local area network (LAN) and to a broad band network such as the Internet, based on a predetermined communication protocol such as Ethernet (Registered Trademark).

On the networks, a plurality of host terminals is connected in a transparent status, so a dispersion computing environment is constructed. On the networks, a software program, a data contents, and the like can be delivered. For example, the operating system for realizing the present invention and the application program designed so that a plurality of the tasks exists, can be downloaded through the networks.

The respective input and output apparatus 14-1, 14-2, ... are assigned with an interrupt level, and, in response to a predetermined event occurrence (for example, a keyboard input, a mouse click, or other GUI processing, or completion of a data transfer in the hard disk), they can notify the processor 11 through an interrupt request signal line 19. The processor 11 executes a corresponding interrupt handler in response to such an interrupt request.

The timer 15 is an apparatus for generating a timer signal at a predetermined period. The timer 15 is also assigned with the interrupt level, so it generates a periodic interruption through the interrupt request signal line 19 to the processor 11.

B. Configuration of Application Program

Figure 2:
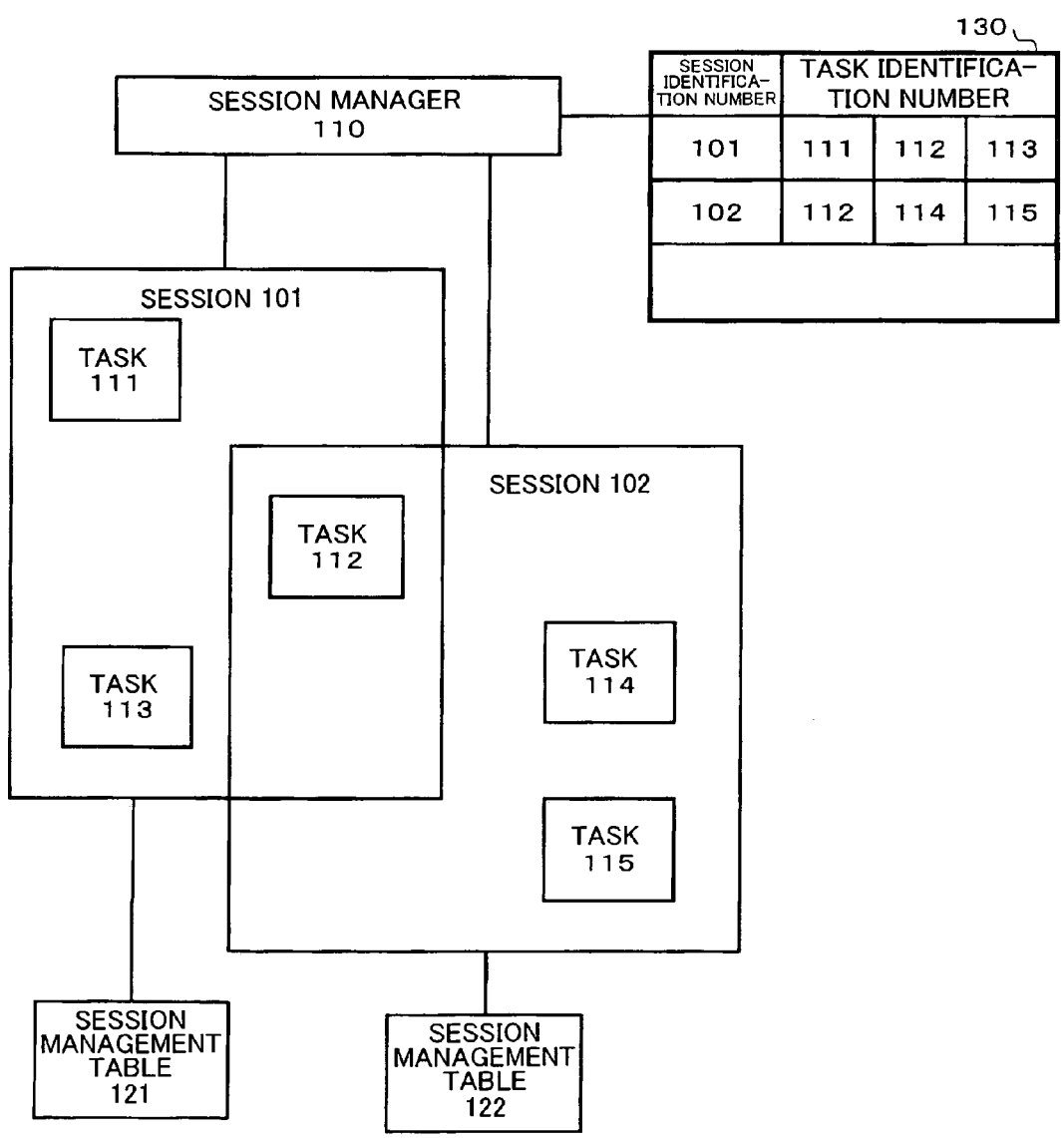
FIG. 2 is a view schematically showing a configuration of an application program.

In the present embodiment, an application program is provided with a plurality of tasks to be executed under the multitasking environment, and can provide a plurality of functions. FIG. 2 shows a configuration of an application program 100 schematically.

According to the illustrated application program 100, by linking a plurality of tasks operating in parallel, a specific function is realized. A series of operations is called as a session, and a task concerning the operation of the session is called as a session configuration task. In an illustrated example, a session 101 provided with the executing order of the task 111, the task 112, and the task 113, and a session 102 provided with the executing order of the task 112, the task 114, and the task 115 are defined.

One of the tasks constituting the application program 100 is a session manager 110 of managing an execution of the function in each session. The session manager 110, in order to centrally manage the entire session in the application program 100, provides a session registration table 130 defined statically and in advance. The session registration table 130 stores identification numbers of each session, identification numbers and the execution orders of the tasks constituting the session, and a hardware resource utilized in the sessions.

In the session registration table 130, the task identification numbers, corresponding to a number of the tasks constituting the session, are registered. In this case, the same task can be overlapped and registered in different sessions. In an example shown in FIG. 2, the task 112 is registered in the session 101 and the session 102.

The session manager 110 manages the resource for executing the session and the executing status, by applying the session registration table 130. A resource management, referred to above, includes a generation of the instance of the task constituting the session and a management of the input and output operations performed by applying the task.

The session, in the same way as the task, can convert the execution status of operations such as start, interruption, restart, termination. The operation and the management of the execution status in the session unit are performed by the session manager 110 in response to a command from outside.

In the case of the operation of the session, the session manager 110 operates with the entire task constituting the session all together, so a session operation requesting side is unnecessary to pay attention to the respective session configuration tasks.

The start of the session is performed by the session manager 110 reading the identification numbers of the respective tasks, constituting the corresponding session, from the session registration table 130 and making the corresponding tasks to start all together. In the above case, the session manager 110 generates a session management table of the corresponding session, and records and supervises the identification number and the operating status of the corresponding session and the respective session configuration tasks.

An operation of the interruption and restart of the session is performed by the session manager 110 simultaneously interrupting or restarting the executions of the session configuration tasks recorded in the session management table with respect to the session with the designated identification number.

Further, the termination of the session is performed by the session manager 110 forcibly terminating the session configuration tasks all together and deleting the session management table of the corresponding session.

The operations of the respective tasks constituting the session in the case of the above session operations are controlled by the session manager 110 issuing a system call of the operating system. A plurality of the sessions can be registered in a single application program, so it is possible to simultaneously operate a plurality of the sessions in parallel. Also, it is possible to simultaneously operate the same variety of sessions. Further, it is possible to share the same task among different variety of sessions.

Here, a built-in application in the DVD recording and reproducing apparatus is assumed as an example, and a functional configurations and mode of operation of the application program according to the present invention will be described.

Figure 3:
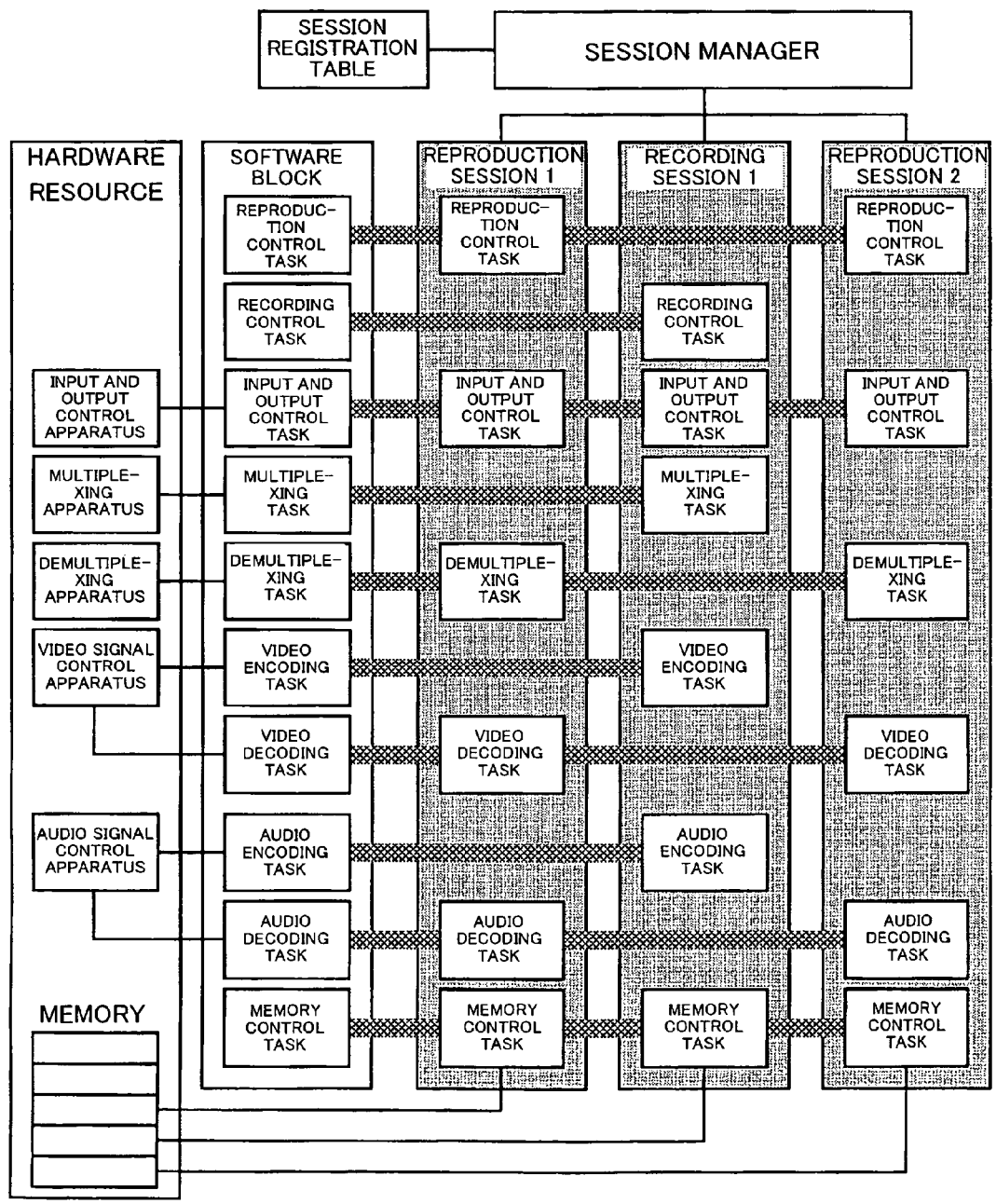
FIG. 3 is a view schematically showing a configuration of a built-in application in a DVD recording and reproduction apparatus.

FIG. 3 shows a configuration of the built-in application in the DVD recording and reproducing apparatus.

The application program is provided with a plurality of tasks. In the illustrated example, the tasks constituting the application program are stored in a software block (note that, except the session manager), and includes the tasks such as a reproduction control task, a recording control task, an input and output control task, a multiplexing task, a demultiplexing task, a video encoding task, a video decoding task, an audio encoding task, an audio decoding task, and a memory control task. And the application program is applied with the hardware resource such as an input and output control apparatus, a multiplexing apparatus, a demultiplexing apparatus, a video signal control apparatus, an audio signal control apparatus, and a memory.

The application, by linking a plurality of the tasks operating in parallel, realizes specific functions of the reproduction or recording in the recording surface of a DVD. Here, a series of operations concerning the above reproduction or recording is called as a "reproduction session" or a "recording session".

In the illustrated example, the reproduction session is defined by the session configuration task such as the reproduction control task, the input and output control task, the demultiplexing task, the video decoding task, the audio decoding task, and the memory control task. And the record session is defined by the session configuration task such as the recording control task, the input and output control task, the multiplexing task, the video encoding task, the audio encoding task, and the memory control task.

One of tasks constituting the application program is the session manager, which manages the execution of the operation in each session. The session manager, in order to centrally manage the entire session in the application program, is provided with a session registration table defined statically in advance. The session registration table stores the identification number of the sessions such as the reproduction session and the record session, the identification number and the execution number of the tasks constituting the respective sessions, and a hardware resource used in each of the sessions.

In the session registration table, the task identification number is registered corresponding to a number of the tasks constituting the session. In this case, the same task can be registered and overlapped among the different sessions. In the example shown in FIG. 3, the input and output control task and the memory control task are registered in the reproduction session and the recording session respectively.

The session manager, when an open of the session is instructed from outside, refers to the session registration table, obtains the tasks constituting the corresponding session and the hardware resource used by each of the tasks, generates the instance of the session configuration task, and manages the input and output operations to the hardware resource performed by the instance.

These sessions, in the same way as the task, can convert the execution status of the operation such as start, interruption, restart, and termination. The operation and management of the execution status in the session unit is performed by the session manager in response to a command from outside. In the case of the operation of the session, the session manager performs the operation of the entire task constituting the session all together, so a side requesting the operation of the session is unnecessary to pay attention to the respective session configuration tasks.

In the example shown in FIG. 3, the reproduction session, the recording session, and other sessions are registered. In the illustrated example, the reproduction session, the recording session, and other sessions simultaneously operate in parallel. And two reproduction sessions operate simultaneously. Between different variety of the sessions such as the reproduction session and the recording session, the input and output control task and the memory control task are shared. A reproduction session 1, a recording session 2, and a reproduction session 1 show an image in which the instance of the session configuration task in the software block is generated.

C. Task Identification and Message Communication among Tasks

In the previous section B, it is explained the point that the application program provided with a plurality of the tasks and executed under the multitasking environment defines the task needed for realizing the respective functions in each provided function and the execution order thereof as the session, and manages the resource for executing the session in which the session manager constituted as one of the tasks is called and the execution status thereof. Therefore, a plurality of the tasks can be centrally managed as the session and thus merits developed in the task unit such as execution efficiency, productivity, portability, and maintainability can be applied. Also, at a side of operating the session, it can be realized necessary function without paying attention to each task. And the task can be shared among the sessions, so the application can be effectively developed more than the conventional application including only task.

On the other hand, in the application program provided with such the session definition and the session management function, the tasks having the same source code are highly possible to start all together in the sessions in operating on the multitask operating system (for example, referred to FIG. 3).

In the above case, in the case where a message function or a flag function provided by the operating system is applied on the source code, a program developer may need to understand a number of the sessions in advance and encode them, namely, a number of the sessions and a number of the tasks are necessary to be determined in static. Conversely, if the cording is performed on the assumption that a number of the sessions and a number of the tasks are fixed, a part of a change of the source code may be large in the case where a function expansion or reuse is performed, as a result, an expandability or reusability is lowered.

The present invention, to overcome the above disadvantages, is a matter for realizing a mechanism able to cope with the change of a number of the sessions or a number of the tasks.

General built-in equipment (for example, a DVD recording and reproducing apparatus) divides and mounts the tasks into each function block. First, a block ID is defined and added in each function. And a task includes a reception unit such as a message or a mail box.

Figure 4:
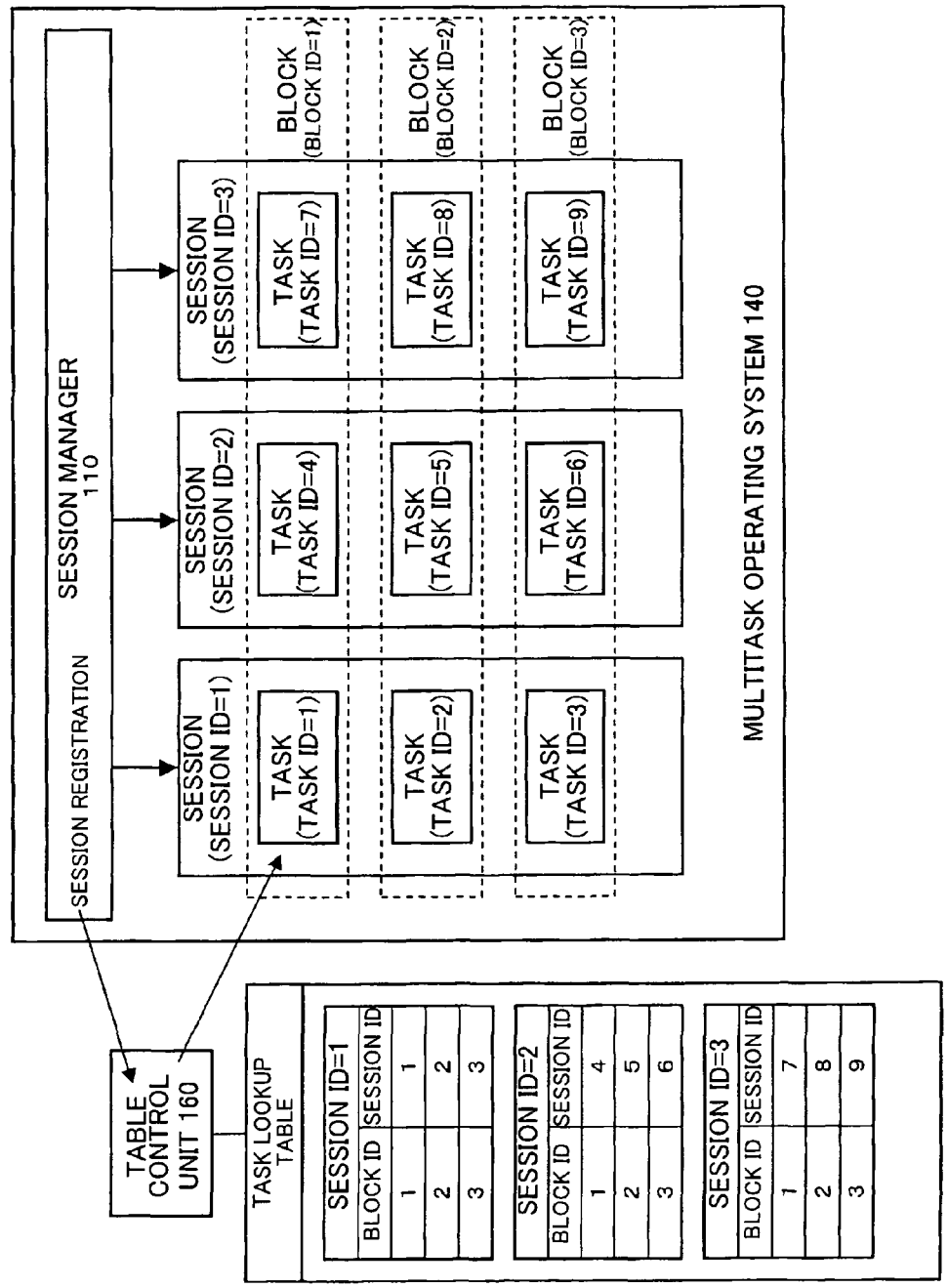
FIG. 4 is a view for explaining a mechanism of an inter-task communication function of a program processing apparatus 10.

FIG. 4 illustrates a mechanism of an inter-task communication function of the program processing system 10 according to the present embodiment. As shown in the figure, the inter-task communication function of the program processing system 10 is provided with the multitask operating system 140, the session manager 110, the task lookup table 150 for referring to the tasks of each function block in the session, and a table control unit for managing the task lookup table 150.

The session is constituted by the session manager 110, and the task constituting the session starts by using the multitask operating system 140.

Figure 5:
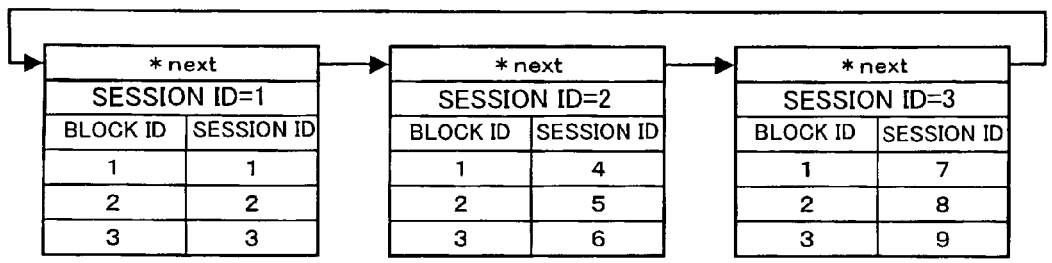
FIG. 5 is a view schematically showing an example of a configuration of a task lookup table 150.

The task lookup table 150 is a quick reference table for referring to the task of each function block in the session. FIG. 5 shows an example of a configuration of the task lookup table 150. As shown in the figure, the task lookup table 150 is tabled in every session, and registers the session ID of each session, a block ID of each the blocks constituting the session, and the task ID of the tasks corresponding to the blocks.

Figure 6:
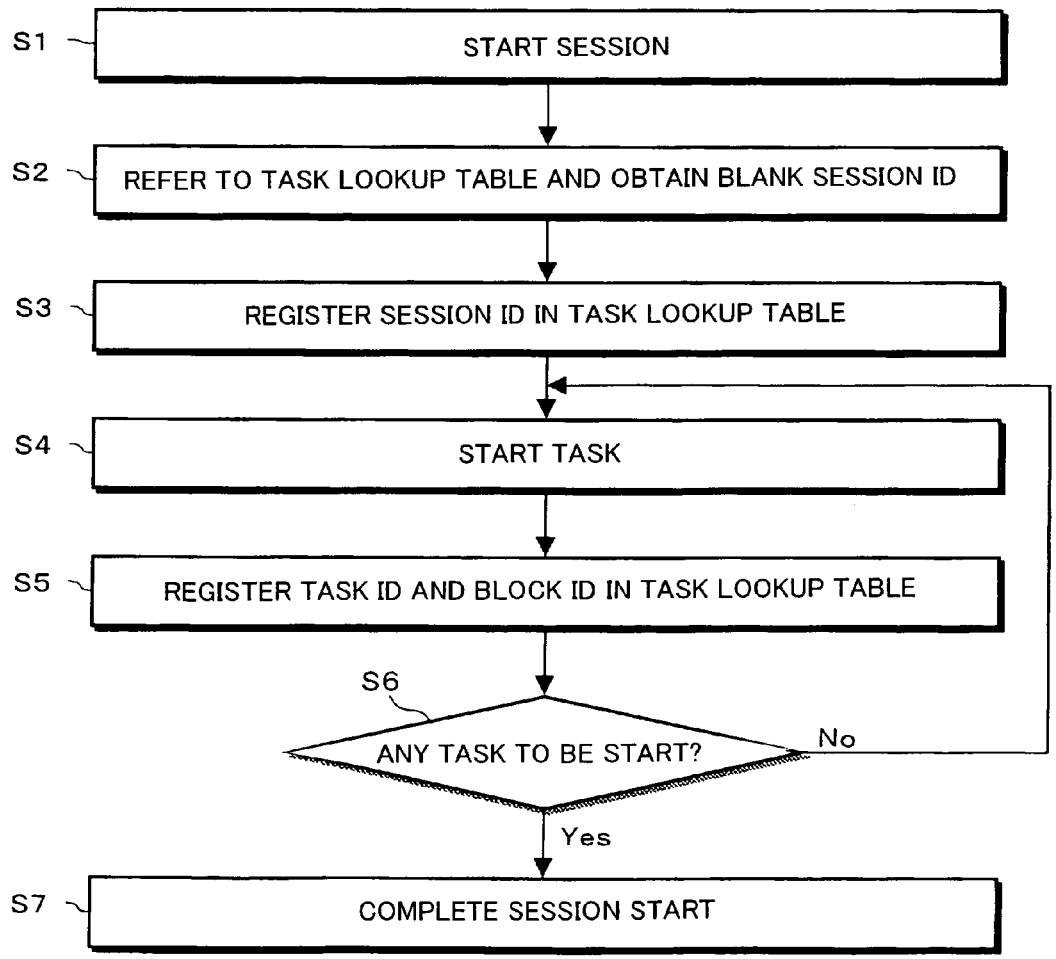
FIG. 6 is a flow chart showing a procedure for providing the task lookup table.
Figure 7:
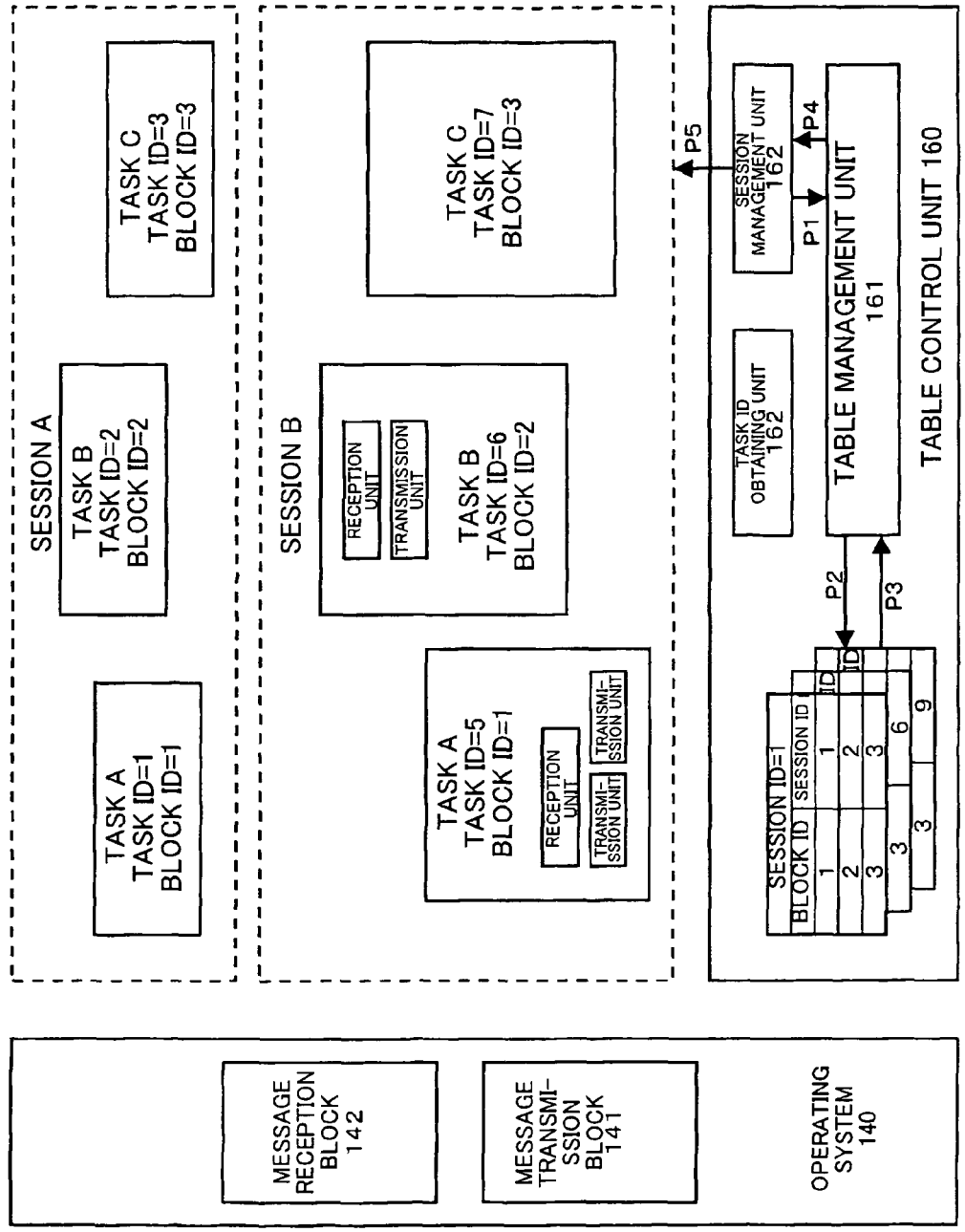
FIG. 7 is a view showing a process flow in providing the task lookup table in the case where a session B starts under a multitasking environment.

FIG. 6 shows a flow chart of a procedure for generating the task lookup table. FIG. 7.*illustrates* a processing flow in the case of a generation of the task lookup table in which the session B starts under the multitasking environment.

When instructing the session open through the command interface, the session starts (step S1), and the session manager 110 inquires a blank session number to the table (step S2, P1).

A table management unit 161 in the table control unit 160 refers to the task lookup table 150, searches for a blank session ID (step S2, P3), and notifies a session management unit 162 with the blank session ID (P5).

And the session management unit 162, in order to start the session by applying the blank session ID, notifies the table management unit 161 with an application of the session ID (step S3, P1). The table management unit 161, in response to the above notice, ensures the session ID to be used on the session lookup table 150 (P2). The session management unit 162 starts the session in the session ID, and instructs the start of the each task belonging to the session to the operating system 140 (step S4).

The session management unit 162 instructs the start of the tasks to the operating system 140, and simultaneously notifies a table management unit 163 with the block ID and the task ID (step S5, P1). And the table management unit 161 records the task ID and the block ID in the task lookup table (P2). The session ID and the block ID are combined to enable an identification of the instance in the task.

The processing of step S4 and S5 are performed until there is no task to be started (step S6), and the entire task to be started (namely, the entire task constituting the session) are registered in the task lookup table of the corresponding session. And, as a registration processing of the entire task to be started is finished, the start of the session is finished (step S7).

Note that, the registration of the task lookup table may be not performed in every start of each of the tasks constituting the session, but may be performed before starting the task or after starting the entire task all together.

In this way, the task lookup table is formed in each started session, so correspondence between the function block and the task in the session becomes clear. And when a certain starting task transmits a message to other task, by referring to the task lookup table, the starting task can obtain the task ID to be a destination.

Figure 8:
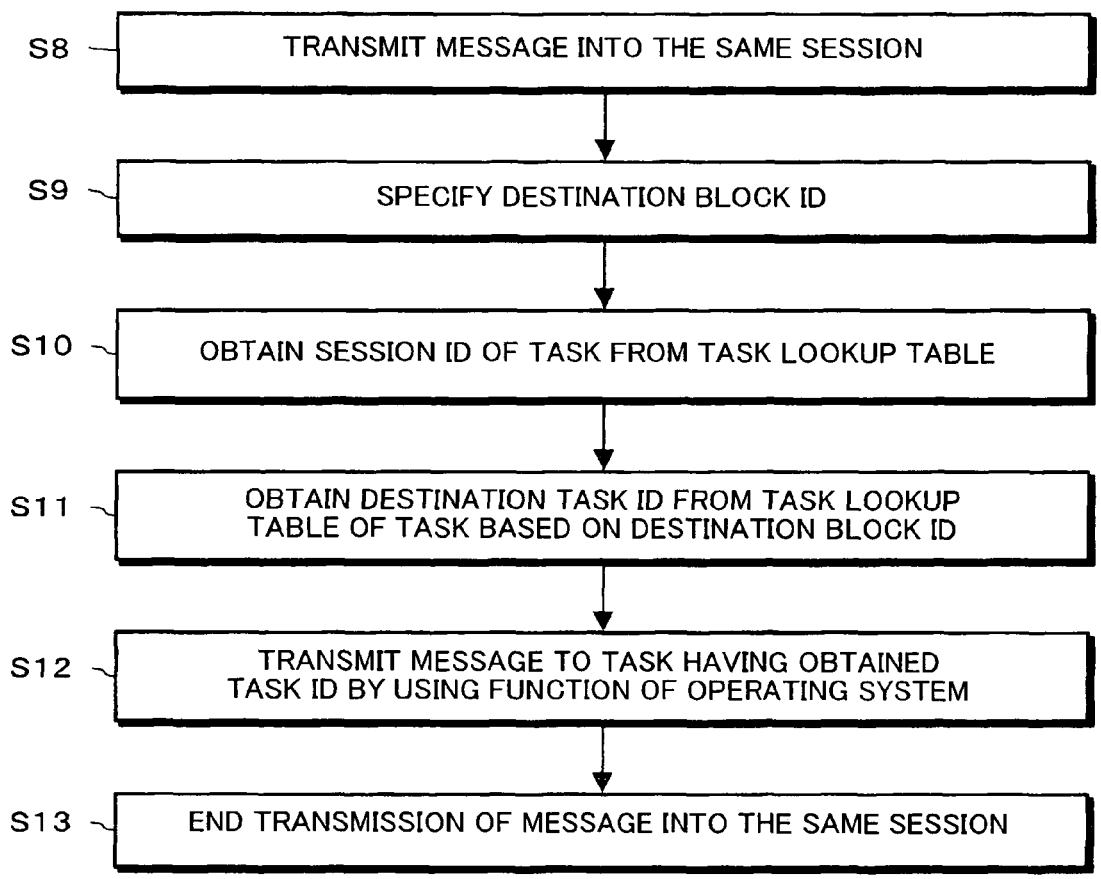
FIG. 8 is a flow chart showing a procedure for obtaining a task ID by referring to the task lookup table to transmit and receive a message.
Figure 9:
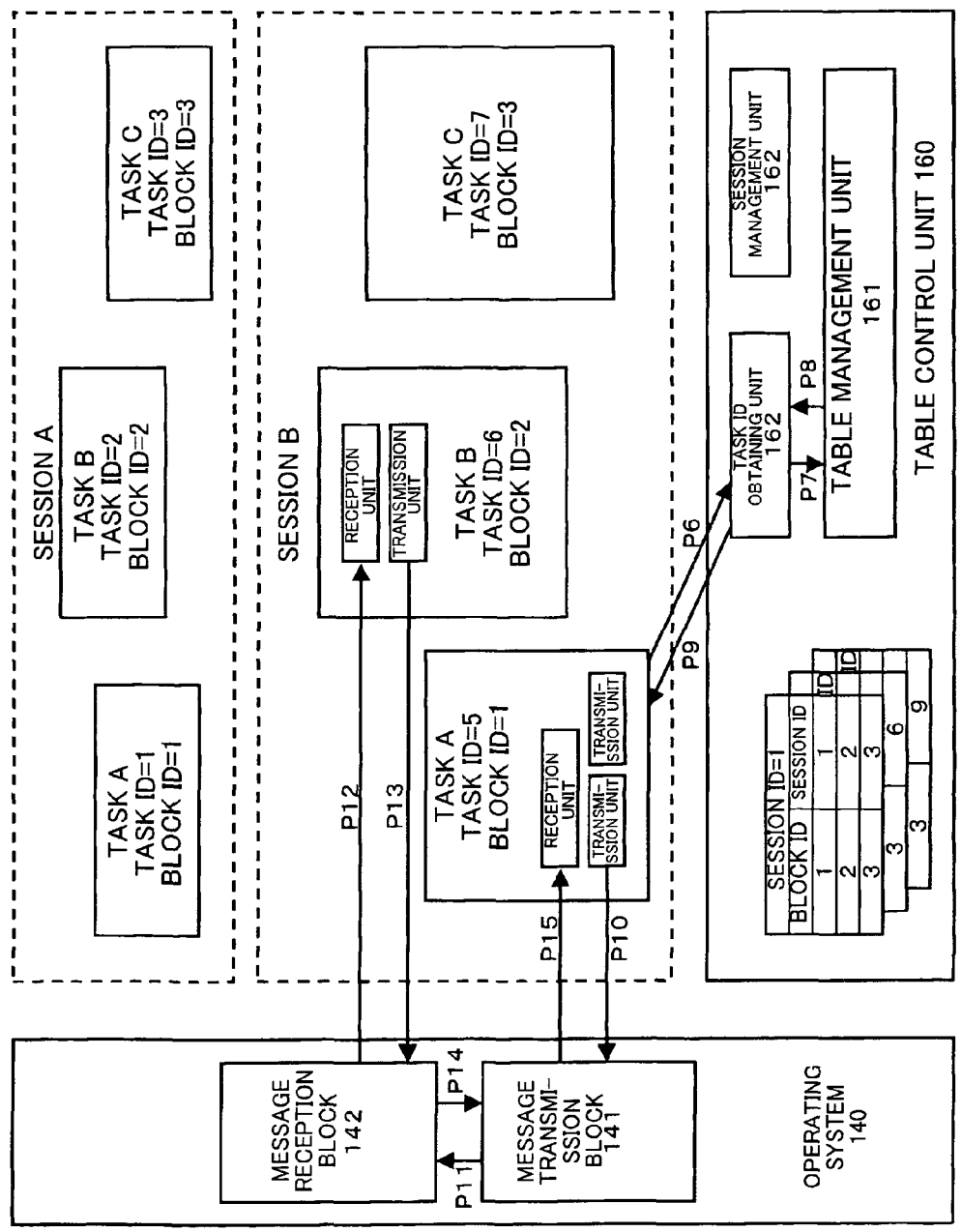
FIG. 9 is a view showing a flow of performing a transmission and reception of the message by applying the task ID given from the task lookup table and the inter-task communication function of an operating system.

FIG. 8 shows a flow chart of a procedure for obtaining the task ID by referring to the task lookup table to transmit or receive a message. FIG. 9 shows a flow of transmitting or receiving the message used with the inter-task communication function of the operating system by applying the task ID given from the task lookup table.

When a certain task transmits the massage in the same session (step S8), the task of a transmitter needs to know a mail box ID of the task to be a destination. The program processing system 100 according to the present embodiment defines the mail box ID as the task ID, it is necessary to prepare the task ID of the destination.

In order to prepare the task ID of the destination, first, the task lookup table of the corresponding session is referred and the block ID is specified (step S9). In the case where a transmission is performed to other session, the session ID can be also designated, however, it is assumed that the message is transmitted to the task in the same session.

After specifying the block ID, the task of the transmitter delivers the block ID to the table management unit 161 (P6). A task ID obtaining unit 163 instructs the table management unit 161 to obtain the task ID from the block ID (P7). The table management unit 161, in response to this instruction, obtains the session ID of the session to which the task of the transmitter belongs (step S10), obtains the task ID from the task lookup table corresponding to the session (P3), and notifies the task ID obtaining unit 163 (P8). The task ID obtaining block delivers the received task ID as a destination task ID to the task which requests it (P9).

By the above operations, the transmitter task obtains the task ID of the destination task in the same session (step S11). The message box ID of the message destination is the same as the task ID of the transmission task, so the task ID is applied as the message transmission ID. As a result, the ID (mid) of the message box is determined necessarily (tid=mid).

Then, the transmitter task, in order to transmit a message, transmits the message box ID (here, the task ID of the destination task) and the message to a message transmission block 141 included in the operating system 140 (step S12, P10). The operating system 140 specifies the message box ID and delivers the message through the message reception block 142 to the destination task (step S13, P12).

The task ID of the transmitter is included in the message to be transmitted from the transmitter task to the destination task, so the message transmission from the destination task to the transmitter task can return the message to the transmitter without referring the task ID from the table (P13, P14, and P15).

Note that, in the above description, a method of transmitting the message is exampled, but embodiments may be possible by the same procedure in a mail box, a flag, or a data queue, for example.

D. Description of Source Code

The application program according to the present embodiment is provided with a plurality of the tasks, and defines the task necessary for realizing the functions in each provided function and the execution order thereof as the session. And, by the execution under the multitasking environment, the tasks including the same source code simultaneously start in a plurality of the sessions.

General operating system provides the inter-task communication function, but does not specify the tasks including the same source code in dynamic. So, in the present embodiment, when the session starts, the block ID are assigned to the respective blocks in which the session is divided into the tasks in every function, and the task lookup table functioning as a quick reference table for the block ID and the task ID is prepared. So, when a certain task transmits a message to other task, the transmitter task designates the destination as the block ID and refers to the task lookup table to obtain the task ID. Then, the task ID of the destination is designated and the message can be transmitted and received by applying the message communication function of the operating system.

Therefore, the destination of the message is designated and the message communication can be preferably performed in the case where a plurality of the tasks including the same source code exists. Below, while referring to the source code constituting the task, a mechanism of a message communication according to the present embodiment will be described.

Figure 10:
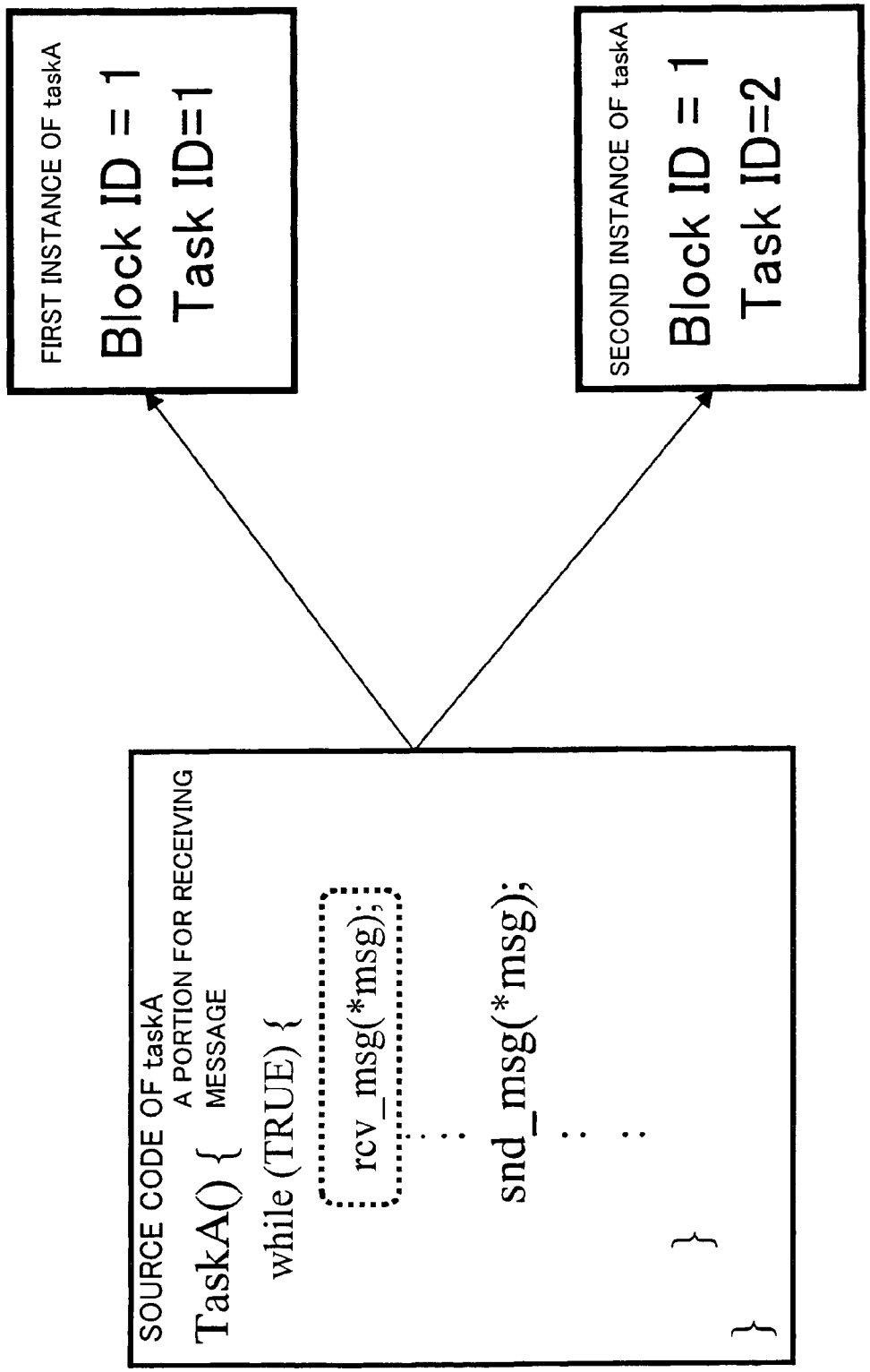
FIG. 10 is a view showing a situation in which an instance of a plurality of tasks including the same source code starts.

FIG. 10 illustrates a situation in which the instances of the tasks including the same source code start.

As shown in the figure, the source code of the task A includes a reception unit of a message constituted by a code "rcv_msg(*msg)" and a transmission unit of the message constituted by a code "snd_msg(*msg)". The source code of the task may include a reception unit.

In response to an instruction of a session open from a command interface, the operating system starts the entire task constituting the session, as a result, the instance thereof is generated. And in the case where the same task is included in a plurality of the sessions in which opening is instructed, as shown in figure, a plurality of the tasks including the same source code starts. As described above, when the tasks start, the correspondence between the task ID and the block ID is registered in the task lookup table concerning the session.

Figure 11:
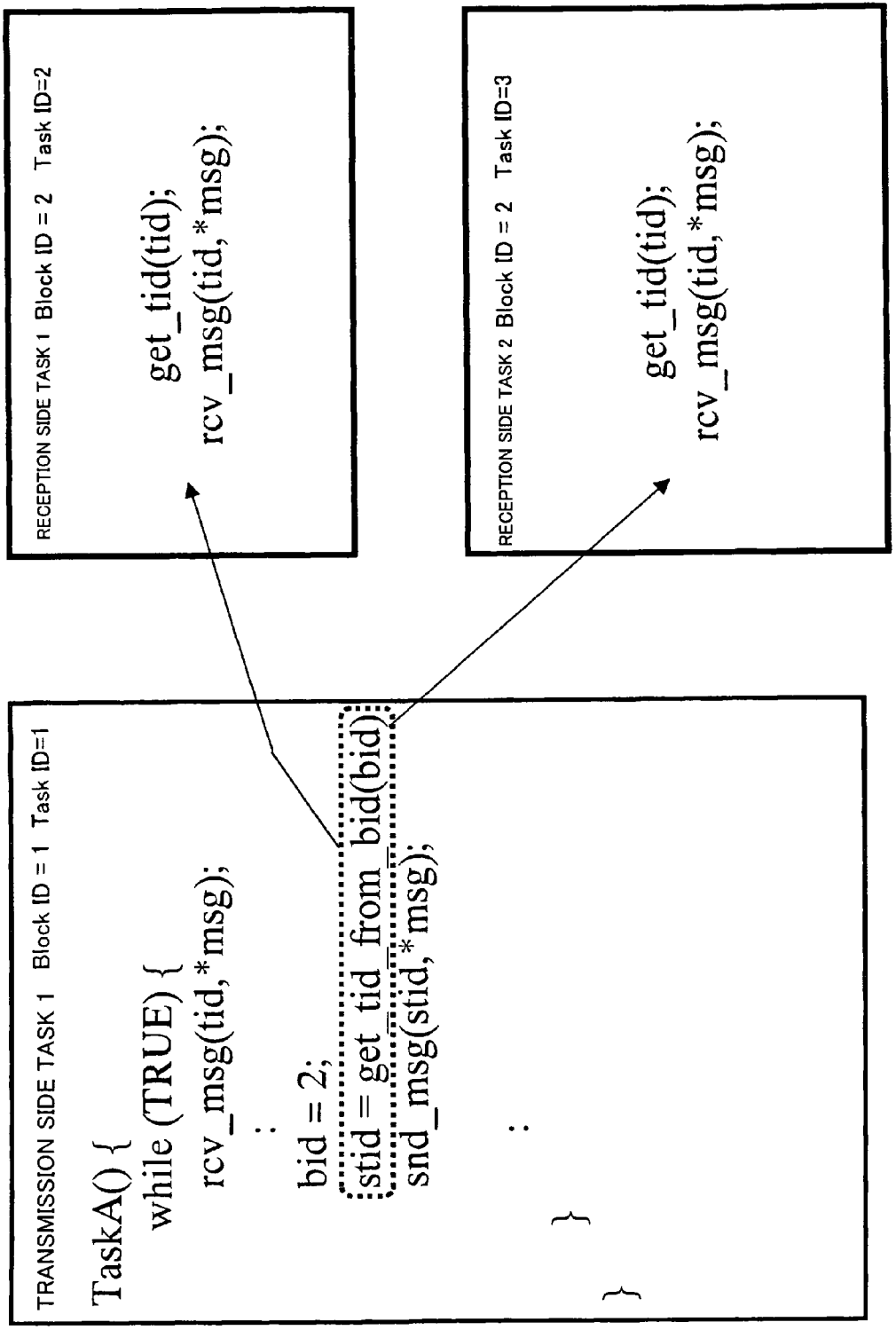
FIG. 11 is a view for explaining a description method of a transmission unit and a reception unit in a source code of the task in the case where a message communication method according to the present invention is applied.

FIG. 11 shows a description method of the transmission unit and the reception unit in the source code of the tasks in the case where the message communication method according to the present invention is applied.

The source code of the task A includes a reception unit of a message constituted by a code "rcv_msg(*msg)" and a transmission unit of the message constituted by a code "snd_msg(*msg)".

As described above, in the present embodiment, the block ID is assigned in each function block in the session to prepare the session lookup table. Therefore, the task of the transmitter can search for the task ID (tid) from the block ID (did) of the task of the destination, and can transmit a message by applying "tid".

In an example shown in FIG. 11, in the task 1 to be the transmitter, the task of the destination is designated by applying the block ID (did=2), also, the task ID, obtained by referring to the task lookup table with the block ID from, is substituted for a variable stid (stid=get_tid_from_bid (bid)), stid is designated as the destination (snd_msg (stid, *msg)), and the message is transmitted. On the other hand, the source code of the task to be the destination may include the reception unit (the same as above). Namely, tid of the transmitter task is obtained by the code "get_tid (tid)", and the message can be received from the transmitter task by the code "rcv_msg (tid, +msg)".

Therefore, the source code is unnecessary to change even if a number of the sessions included in the application program are increased or the configuration of the task is changed.

Figure 12:
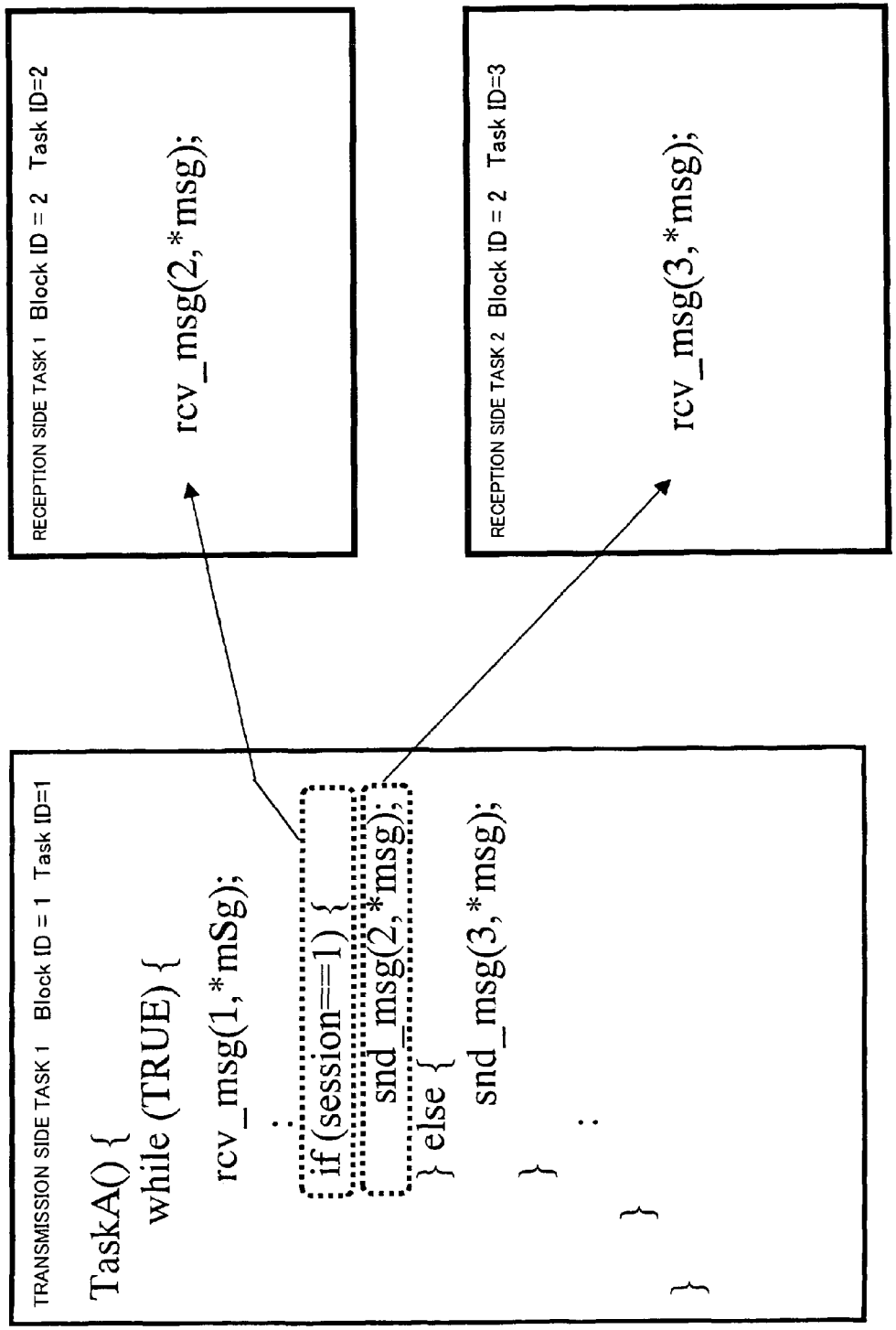
FIG. 12 is a view for explaining an example of directly describing an ID on the source code to realize the transmission and reception of a message in the case where the message is transmitted from a certain task to other task.

Note that, in the case where the massage is transmitted from the certain task to other task, by directly describing an ID on the source code, the transmission and reception of the message communication can be realized under an environment in which tasks including the same source code simultaneously start in the sessions. FIG. 12 shows an example in the above case.

In the example shown in FIG. 12, the source code of the transmitter task is provided with a transmission unit corresponding to the session ID in starting. Namely, the task ID for the destination of the message is two in the case where the task starts in the session 1. The task ID of the same is three in the case where the task starts in other session.

(Supplementation)

While referring to the specific embodiment, the present invention is explained in detail. However, it is clear that a person with an ordinary skill in the art can modify or substitute the present embodiment in the art without departing from the basic concept and scope of the present invention. Namely, the present invention is disclosed in the present embodiment as an example, so described contents in the present description should not be interpreted with limitation. To decide the basic concept and scope of the present invention, a section of Claims should be considered.

As described above, according to the present invention, a program processing system, a program processing method, and a computer program preferably sharable of the same task in a plurality of the functions in the case where the application simultaneously operates with the functions in parallel, can be provided.

And, according to the present invention, a program processing system, a program processing method, and a computer program preferably manageable of the resource of the task shared in a plurality of the functions and its execution status, can be provided.

And, according to the present invention, a program processing system, a program processing method, and a computer program preferably capable of specifying the message destination and performing the message communication in the case where a plurality of the tasks including the same source code exists, can be provided.

According to the present invention, in an execution environment provided by the operating system without a function in which the task to be a target and the transmitting and receiving destinations of the message are specified dynamically, the function can be provided outside the operating system. And by mounting the above message transmitting and receiving functions, the amount of the change of the source code along a change of type or characteristics can be reduced to lead an improvement of the productivity.

INDUSTRIAL APPLICABILITY

The present invention is applicable to a system executing an application under a multitasking environment in which a plurality of the tasks simultaneously pseudo-operates in parallel.

LIST OF REFERENCES

10 . . . program processing system
11 . . . processor
12 . . . RAM

13 ... ROM
14 ... input and output apparatus
15 ... timer
16 ... system bus
19 ... interpret request line
21 ... display
22 ... keyboard
23 ... mouse
24 ... HDD
25 ... media drive
100 ... application program
101, 102 ... session
110 ... session manager
111, 112, 113, 114, 115 ... task
121, 122 ... session management table
130 ... session registration table
140 ... multitask operating system
150 ... task lookup table
160 ... table control unit

The invention claimed is:

1. A program processing system including a processor for executing a program comprising a plurality of tasks under a multitasking environment in which the plurality of the tasks pseudo-operates in parallel and an execution environment provided by a multitask operating system providing an inter-task communication function, the system comprising:
 a session defining means for defining a task needed for realizing a function and its execution order in every function provided by the program as a session;
 a session management means for managing a resource for executing the session and an execution status using a task lookup table,
 wherein the session management means generates an instance of respective tasks constituting the session in starting the session, assigns an identification information of the session and an identification information of the instance to the session and the instance of the respective tasks constituting the session, records in the look up table for the session (i) block identification information for the respective tasks constituting the session and (ii) instance task identification information corresponding respectively to the block identification information for the respective tasks constituting the session, and manages each identification information on the task lookup table of each session; and
 a message communication means for referring to the task lookup table of the session including the task, for specifying the task based on the instance task identification information of a destination task, wherein the instance task identification information of the destination task is obtained from the task lookup table, and for performing a transmission and reception of a message by applying the inter-task communication function provided by the operating system, wherein the transmitting of the message includes using the block identification information for the destination task to obtain the instance task identification information of the destination task from the task lookup table, wherein the message includes the instance task identification information of a transmitter task at which the message is generated, wherein the message communication means is built into the respective tasks.

2. A program processing system as set forth in claim 1, wherein the task lookup table is generated so as to share the same task among a plurality of the sessions.

3. A program processing method executing a program formed by a plurality of tasks under a multitasking environment in which the plurality of the tasks operates in parallel and an execution environment provided by a multitask operating system providing an inter-task communication function, the method comprising:
 a session defining step being executable by a processor and of defining a task needed for realizing a function and its execution order in every function provided by the program as a session;
 a session management step of managing a resource for executing the session and an execution status using a task lookup table,
 wherein, in the session management step, an instance of respective tasks constituting the session is generated in starting the session, an identification information of the session and an identification information of the instance are assigned to the session and the instance of the respective tasks constituting the session, (i) block identification information for the respective tasks constituting the session and (ii) instance task identification information corresponding respectively to the block identification information for the respective tasks constituting the session are recorded in the lookup table for the session, and the respective identification information is managed on the task lookup table of each session; and
 a message communication step of referring to the task lookup table of the session including the task, specifying the task based on the instance task identification information of a destination task, wherein the instance task identification information of the destination task is obtained from the lookup table, and performing transmission and reception of a message by applying the inter-task communication function provided by the operating system, wherein the transmission of the message includes using the block identification information for the destination task to obtain the instance task identification information of the destination task from the task lookup table, wherein the message includes the instance task identification information of a transmitter task at which the message is generated, wherein the message communication step is built into the respective tasks.

4. A program processing method as set forth in claim 3, further comprising a step of generating the task lookup table so as to share the same task among a plurality of the sessions.

5. A computer program stored on a memory and executable by a computer to realize a plurality of functions executed under a multitasking environment in which a plurality of the tasks operates in parallel and an execution environment provided by a multitask operating system providing an inter-task communication function, the program comprising:
 a session defining means for defining a task needed for realizing the function and its execution order of each function provided by the program as a session;
 a session management means for managing a resource for executing the session and an execution status using a task lookup table; and
 a message communication means for communicating among the tasks,
 wherein the session management means generates an instance of respective tasks constituting the session in starting the session, assigns an identification information of the session and an identification information of the instance to the session and the instance of the respective tasks constituting the session, records in the look up table for the session (i) block identification information for the respective tasks constituting the session and (ii) instance task identification information corresponding respectively to the block identification information for the respective tasks constituting the session, and manages the respective identification information on the task lookup table of each session, and wherein the message communication means is for referring to the task lookup table of the session including the task and specifying the task based on the instance task identification information of a destination task, wherein the instance task identification information of the destination task is obtained from the task lookup table, and the message communication means performs the transmission and reception of the message by applying the inter-task communication function provided by the operating system, wherein the transmission of the message includes using the block identification information for the destination task to obtain the instance task identification information of the destination task from the task lookup table, wherein the message includes the instance task identification information of a transmitter task at which the message is generated, wherein the message communication means is built into the respective tasks.

6. A computer program stored on a memory and executable by a computer so as to execute a processing of a program comprising a plurality of tasks on a computer system under a multitasking environment in which the plurality of the tasks operates in parallel and an execution environment provided by a multitask operating system providing an inter-task communication function, the program performs the steps of:

a session defining step of defining a task needed for realizing the function and its execution order of each function provided by the program as a session;

a session management step of managing a resource for executing the session and an execution status using a task lookup table, wherein, in the session management step, an instance of respective tasks constituting the session is generated in starting the session, an identification information of the session and an identification information of the instance are assigned to the session and the instance of the respective tasks constituting the session, (i) block identification information for the respective tasks constituting the session and (ii) instance task identification information corresponding respectively to the block identification information for the respective tasks constituting the session are recorded in the lookup table for the session, and the respective identification information are managed on the task lookup table in every session; and a message communication step of referring to the task lookup table of the session including the task, of specifying the task based on the instance task identification information of a destination task, wherein the instance task identification information of the destination task is obtained from the corresponding task lookup table, and of performing transmission and reception of a message by applying the inter-task communication function provided by the operating system, wherein the transmission of the message includes using the block identification information for the destination task to obtain the instance task identification information of the destination task from the task lookup table, wherein the message includes the instance task identification information of a transmitter task at which the message is generated, wherein the message communication step is built into the respective tasks.

* * * * *